May 23, 1933. A. K. HANKS 1,910,989
PICTURE PROJECTION APPARATUS
Original Filed Nov. 22, 1924 2 Sheets-Sheet 1
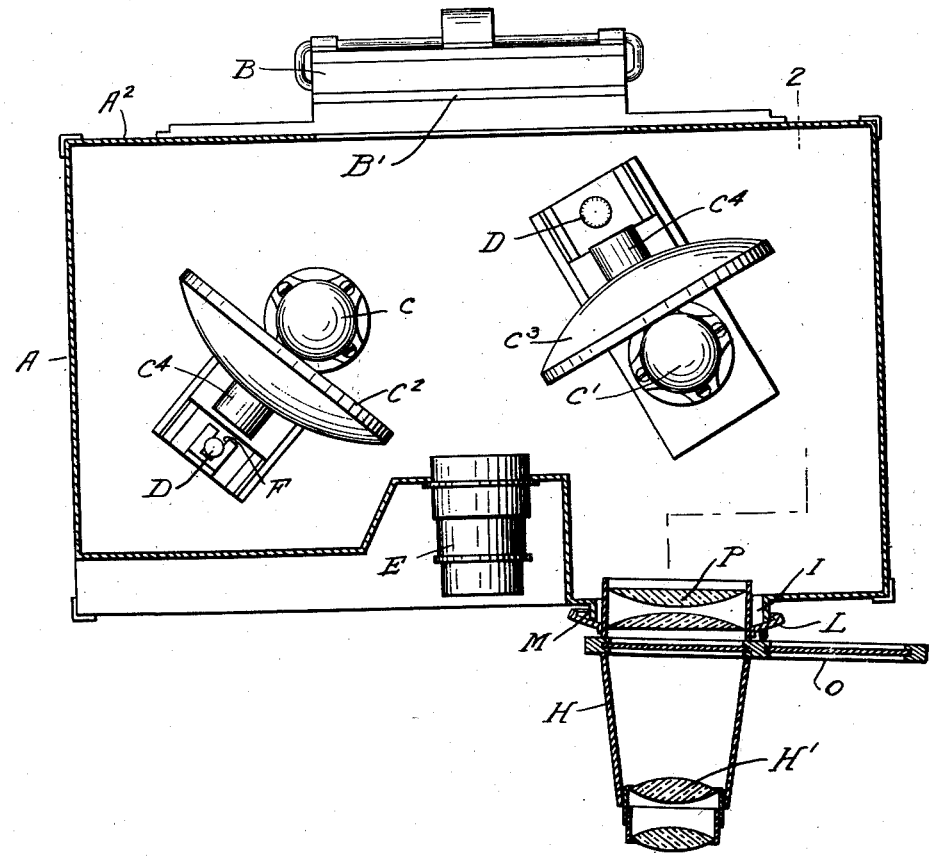
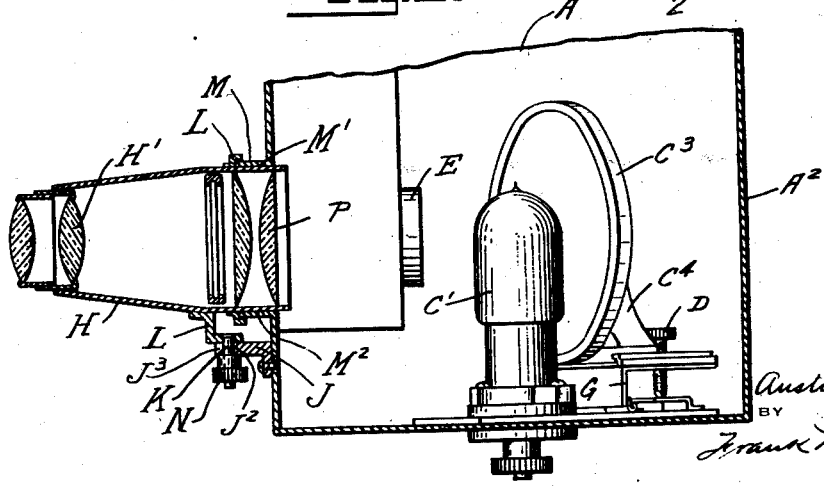
INVENTOR
Austin K. Hanks
BY
Frank M. Ashley
ATTORNEY May 23, 1933. A. K. HANKS 1,910,989
PICTURE PROJECTION APPARATUS
Original Filed Nov. 22, 1924 2 Sheets-Sheet 2
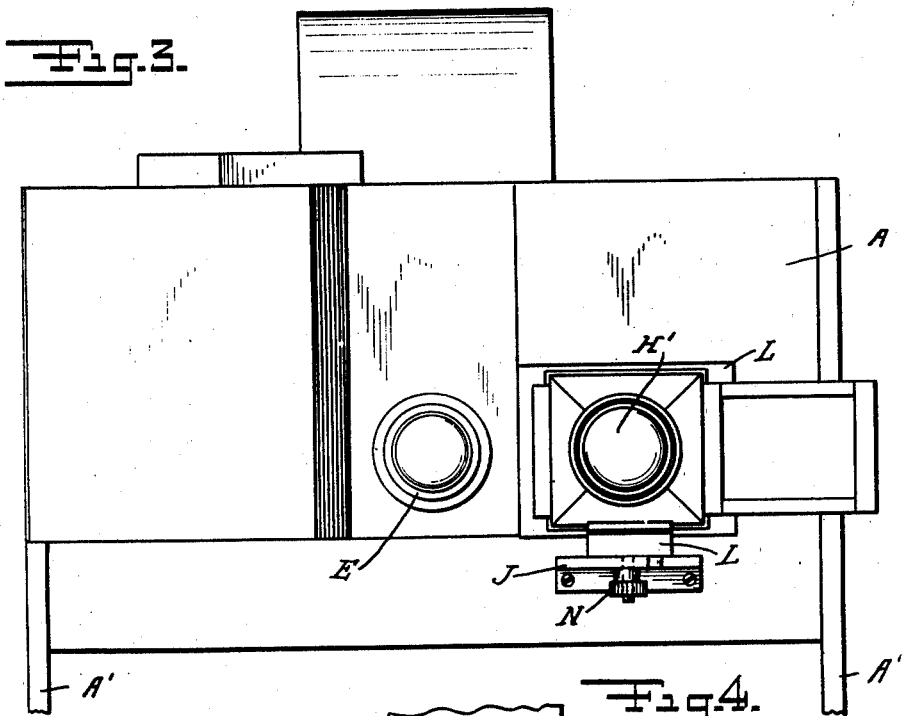
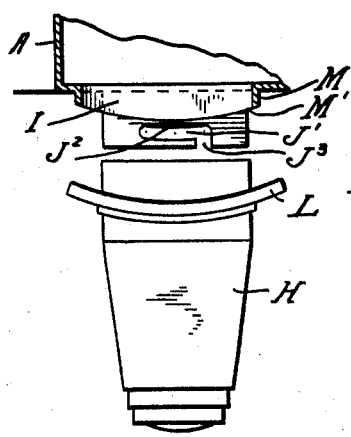
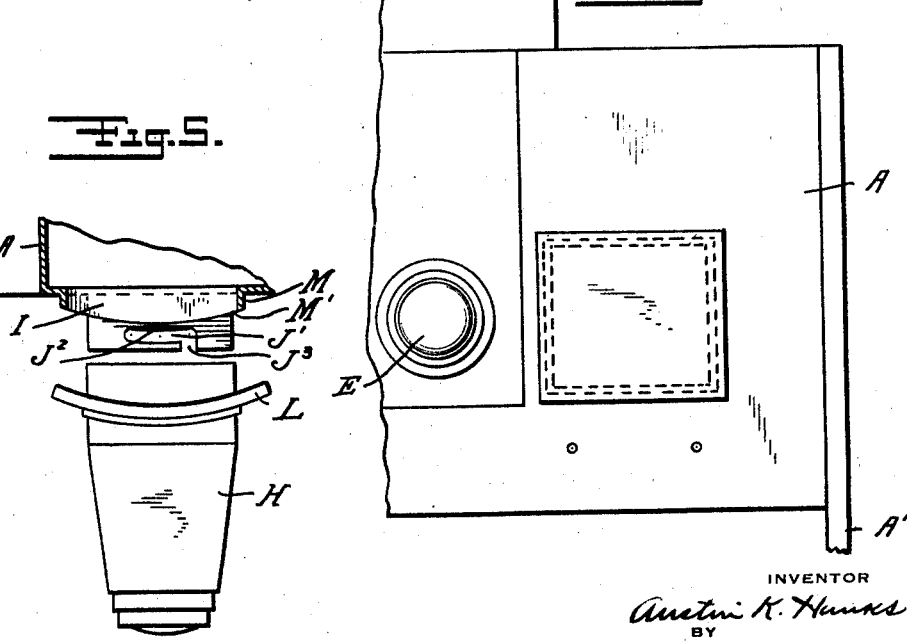
INVENTOR
Austin K. Hanks
BY
ATTORNEY Patented May 23, 1933

1,910,989

UNITED STATES PATENT OFFICE

AUSTIN K. HANKS, OF WEST FROSTPROOF, FLORIDA, ASSIGNOR TO TRANS-LUX DAYLIGHT PICTURE SCREEN CORPORATION, OF NEW YORK, N. Y., A CORPORATION OF DELAWARE

PICTURE PROJECTION APPARATUS

Application filed November 22, 1924, Serial No. 751,472. Renewed April 13, 1932.

My invention relates to picture projection apparatus.

An object of my invention relates to the provision of an improved projector utilizable alternatively, when desired, for opaque and transparent projection.

A further object of my invention is to provide an improved apparatus by means of of which opaque objects such as book pages, illustrations, photographs, post cards, engraved metal and carvings may be projected on a screen and viewed in an ordinary room in daylight, in combination with means whereby the ordinary transparent slides may also be used to project a picture to the same display screen at the same time the opaque object is shown to form a composite picture on the screen.

A further object of the invention is to provide a removable lens holding unit that can be readily attached and adjusted relative to the body portion of the stereoptican and in proper relation to the lamp therein by a person unskilled in the operation of the apparatus, and also permits the use of different sets of lenses with the lantern.

This apparatus is especially adapted for use in connection with the type of screen used for through projection which is accomplished by placing the projection apparatus at the rear of the screen, and the picture being viewed from the front, the optical arrangement being such that the characters of an ordinary printed page are reversed as regards right and left, the image of the word T H U S appearing S U H T when viewed from the position of the rear of the machine, that is, looking in the direction in which the light is projected, but is correct when viewed from the front, the image then appearing T H U S. In order to accomplish "opaque" projection with through projection screens, it is necessary to employ illuminants of the highest efficiency, such as electric lamps of high candle power, which are used in conjunction with reflectors of very high optical correction and efficiency in order to obtain sufficiently intense illumination in a limited space to make the use of the combination practical when viewed in an ordinary lighted room, or in daylight, as distinguished from darkness. By contrast, be it stated that the design of other apparatus constructed for "opaque" projection (of the educational type) and of the required optical corrections and efficiency, make their use in a darkened room, or in total darkness a necessity for best or even fair results. The screen must in any event be placed in such location as to be practically in total darkness. Also in all such apparatus of which I am aware, one plane surface mirror is used in conjunction with the projection objective, to reflect the optical image in order that book page, type matter, etc., may appear correct upon the ordinary screen, such as a canvas, curtain or a plane wall.

Referring now to the drawings which form a part of these specifications:

Figure 1 is a plan view, the top of the casing being removed to expose the interior arrangement of the parts.

Figure 2 discloses a lamp and reflector and means by which the reflector is adjusted relative to the lamp, and a longitudinal view through the removable lens unit, all on the line 2—2 of Figure 1.

Figure 3 is a front elevational view of the apparatus.

Figure 4 is a front elevational view of the portion which carries the removal lens unit, the said unit being removed and the opening through the casing being covered by a removable plate.

Figure 5 is a plan view of the removable unit, and sectional view of the part of the casing in which the unit fits.

A indicates a casing which is generally made of sheet metal and which is supported by four legs of the same material indicated by A'—A'—etc., respectively. Mounted permanently on the back of the casing is a sheet metal housing B the walls of which are spaced a short distance from the back wall A² of the casing, to provide a space B' in which the opaque picture is supported. C and C' indicate electric lamps of the concentrated filament or Mazda type to provide illumination of intense concentration and brilliancy. The lamp C and its co-operative reflector are mounted on the bed sheet of the casing to project light at an angle of about 45 deg. to the plane surface of the picture card carried in the card carrier, located in the space B' in the housing B, the light being reflected through the lens in the lens carrier E to the near side of screen of translucent material on which the image is formed and viewed by observers from the far side of the screen. The lamps C and C' are both adjusted relative to the picture and lens at the proper distance and the mirrors C² and C³ are then adjusted to focus the light, by screens D—D respectively, which act to tilt the mirrors and hold them in their proper adjusted positions. This is accomplished by providing each mirror with a bracket C⁴ which is provided with a base having a longitudinally extending groove F—see Figure 1—mounted on the hinged frame G which the screw D engages. This construction permits the mirror to be moved on the frame G to or from the lamps in making the required adjustments to properly focus the light. A lens carrier or holder and lens for projecting "transparencies" is indicated by H and H' respectively, and the lamp C' is used for this purpose. The mirror is rotated until it reflects the light through the lens held by the holder H. The axial line through the holder H is such that the lamp and lens will be in alignment with the center of the screen so that without changing the position of the screen or projecting apparatus, either an opaque subject may be shown by projection through holder E or a transparent slide through holder H, or both may be simultaneously used to form a picture on the screen.

For illustration: a green colored transparency could be projected through lens H' showing a field of green grass and trees, to be used as a background for an opaque projection through lens in holder E showing boys and girls at play in the same field. In this way many new composite pictures may be formed. To provide a construction in which the lens H' is used, that may be readily attached and detached to the body portion A, and located in proper relation to the lamp therein and at a proper angle to form a picture on the screen in conjunction with the opaque projecting lens, is one of the important features of my invention. An opening indicated by I is formed in the casing A, and a bracket J is securely mounted on the front of the casing just below said opening I and provided with a slot J', the back end J² of which serves as an abutment for a stud screw K, the shank of which is securely fastened in a bracket L carried by the lens holder H. The slot J' is curved as illustrated in Figure 5 so that the stud K is guided in the arc of a circle, the center of which is the lamp C'. A shield L for light is carried on the lens holder H and is curved to correspond with the curvature of the slot J' and the outer curved end M' of a projecting flange M formed on the casing A. An opening J³ in the bracket J permits the shank of the stud screw to enter the slot J' and the lens holder is held in its adjusted position by means of a nut N. The nut may usually be dispensed with as the holder is held in practically locked engagement in most of its adjusted positions, as will be readily understood from the drawings. It will be observed that the top and bottom sides of the lens holder at M' and M² respectively are supported by the walls of the casing which practically carry the weight of the condenser lens P, thus reducing the strain on the bracket J. This construction permits the lens holder H to be placed in proper position quickly and accurately relative to the lamp C' and lens in holder E.

The view in Figure 1 indicates the arrangement of the two lamps when set for joint use in projecting a composite picture, the transparent slide being carried in the slide carrier O, and the opaque picture held in the space B' and reflected through holder E to the screen, as will be readily understood.

In my United States Letters Patent No. 1,831,766 I have described means for cooling the apparatus and protecting the opaque picture and lens from becoming overheated, and therefore do not claim in this application the subject matter claimed in said Letters Patent.

In exhibiting opaque subjects, both lamps C and C' may be used, thus providing very high illuminating power. To this end, the mirror C³ may be rotated through an angle of approximately 180° as more particularly described in my aforesaid U. S. Letters Patent No. 1,831,766.

After the screen has been placed in proper position to be viewed by an audience, the apparatus is set about five feet behind the screen and the light focused to the center thereof.

Having thus described my invention I claim as new:—

1. An apparatus of the character described comprising a casing having an opening therein, a lens holder of less width than said opening, resting therein, and a bracket carried by the casing on which said lens holder is mounted in adjustable relation thereto, one of said parts having a slot formed therein and extending transversely of said opening and the other part having a stud guided in said slot.

2. An apparatus of the character described comprising a casing having an opening therein, a lens holder of the same height but of less width than said opening, resting therein, and a bracket carried by the casing on which said lens holder is mounted in adjustable relation thereto, one of said parts having a slot formed therein and extending transversely of said opening and the other part having a stud guided in said slot.

3. In combination, a casing having an opening in one wall thereof, a source of illumination in said casing, a lens holder disposed in said opening, and a stud on said holder received within a slot on said casing, said slot being concentric with said source of illumination and permitting lateral adjustment of the lens holder.

4. In combination, a casing having an opening in one wall thereof, a source of illumination in said casing, a lens holder disposed in said opening, a stud on said holder received within a slot on said casing, said slot permitting lateral adjustment of said lens holder and being concentric with said source of illumination, and a nut threaded on said stud to secure said holder in adjusted position.

5. Projection apparatus comprising a casing, a plurality of spaced objective lenses carried by the front wall of said casing and having their respective optical axes disposed approximately in parallel relation, means for supporting a transparent object in projection position with respect to one of said lenses, means for supporting an opaque object in projection position with respect to another of said lenses, a lamp in said casing at one side of the optical axis of that objective lens adapted for opaque projection, the optical axis of that objective lens adapted for transparent projection intercepting said lamp, and a mirror in said casing at the other side of the optical axis of said objective lens adapted for opaque projection, said opaque object being positioned a greater distance from said front casing wall than said lamp and mirror whereby light from said lamp and mirror first passes rearwardly toward said opaque object and is thereby reflected forwardly through said objective lens adapted for opaque projection.

6. Projection apparatus comprising a casing, a plurality of spaced objective lenses carried by the front wall of said casing and having their respective optical axes disposed approximately in parallel relation, means for supporting a transparent object in projection position with respect to one of said lenses, means for supporting an opaque object in projection position with respect to another of said lenses, and lamps in said casing at opposite sides of that objective lens adapted for opaque projection, the optical axis of that objective lens adapted for transparent projection intercepting one of said lamps, a straight line joining said lamps being disposed between said front casing wall and said opaque object whereby light from said lamps passes rearwardly toward said opaque object and is thereby reflected forwardly through said objective lens adapted for opaque projection.

7. Projection apparatus comprising a casing, a plurality of spaced objective lenses carried by the front wall of said casing and having their respective optical axes disposed approximately in parallel relation, means for supporting a transparent object in projecting position with respect to one of said lenses, means for supporting an opaque object in projection position with respect to another of said lenses, said last named means comprising a housing carried by the rear casing wall and disposed in alinement with the optical axis of said last named objective lens, a lamp in said casing at one side of the optical axis of said last named objective lens, and a mirror in said casing at the other side of the last named optical axis, the optical axis of that objective lens adapted for transparent projection intercepting said lamp, said opaque object being positioned in said housing at a greater distance from said front casing wall than said lamp and said mirror whereby light from said lamp and mirror first passes rearwardly toward said opaque object and is thereby reflected forwardly through said objective lens adapted for opaque projection.

8. Projection apparatus comprising a casing, a plurality of spaced objective lenses carried by the front wall of said casing and having their respective optical axes disposed approximately in parallel relation, means for supporting a transparent object in projection position with respect to one of said lenses, means for supporting an opaque object in projection position with respect to another of said lenses, and a lamp in said casing at one side of the optical axis of that objective lens adapted for opaque projection, the optical axis of that objective lens adapted for transparent projection intercepting said lamp, said opaque object being positioned a greater distance from said front casing wall than said lamp whereby light from the latter first passes rearwardly toward said opaque object and is thereby reflected forwardly through said objective lens adapted for opaque projection.

9. Projection apparatus comprising a casing, a plurality of spaced objective lenses carried by the front wall of said casing and having their respective optical axes disposed approximately in parallel relation, means for supporting a transparent object in projection position with respect to one of said lenses, means for supporting an opaque object in projection position with respect to another of said lenses, and lamps in said casing at opposite sides of that objective lens adapted for opaque projection, a straight line joining said lamps being disposed between said front casing wall and said opaque object whereby light from said lamps passes rearwardly toward said opaque object and is thereby reflected forwardly through said objective lens adapted for opaque projection.

Signed at New York, in the county of New York and State of New York this 9th day of September, A. D. 1924.

AUSTIN K. HANKS.